July 3, 1962 M. H. FINK 3,041,660
METHOD AND APPARATUS FOR CURING THERMOSET RESINS
Filed July 25, 1960 2 Sheets-Sheet 1

INVENTOR.
Miller H. Fink
BY William D. Harris Jr.
Attorney

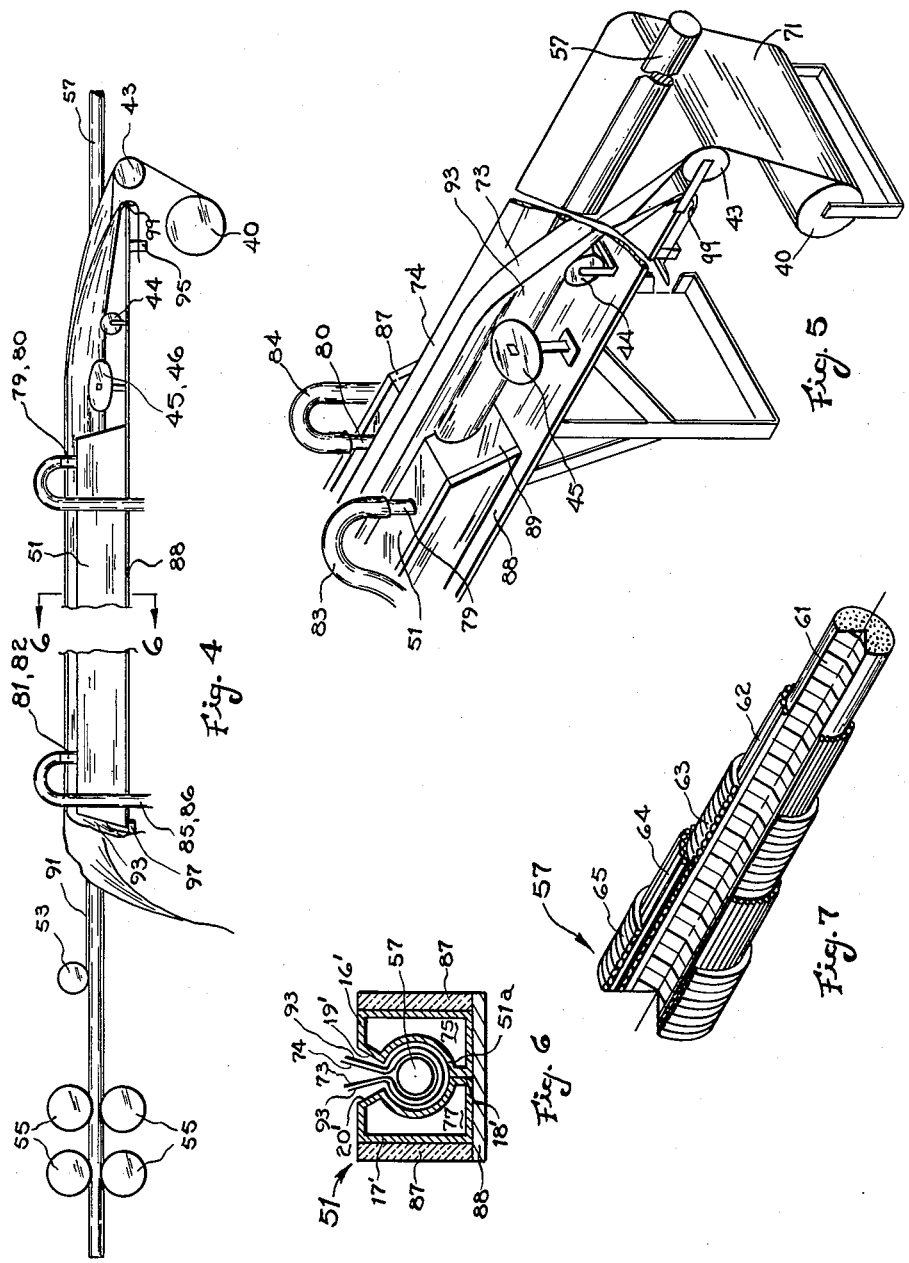

United States Patent Office 3,041,660
Patented July 3, 1962

3,041,660
METHOD AND APPARATUS FOR CURING THERMOSET RESINS
Miller H. Fink, Centralia, Mo., assignor to A. B. Chance Company, Centralia, Mo., a corporation of Missouri
Filed July 25, 1960, Ser. No. 45,048
6 Claims. (Cl. 18—6)

This invention relates to a method and apparatus for curing thermoset resin masses.

It is well known in the art that thermosetting plastics may be solidified in suitable dies to obtain desired shapes by the application of heat.

It is likewise known in the art that thermosetting plastic resins may be used as a matrix for supporting various structural members and fibers. This has been accomplished by various means by bringing liquid state resin about the structural members and then curing the resin to form a solidified matrix embedding the structural members. An example is strands or cloth embedded in a matrix of epoxy resin.

However, the difficulty has been previously encountered that the thermosetting resin being cured sticks to the dies and/or runs unevenly to cause the solidified product to have a rough surface and a shape that often does not reproduce the shape desired with a high degree of fidelity. This problem is particularly severe when curing is conducted in a continuous operation.

Accordingly, it is an object of my invention to provide a method for curing thermoset resin masses so that the product formed has smooth, glossy surfaces and so that the shape obtained reproduces that desired with a high degree of fidelity; it is a further object of my invention to provide a simple and inexpensive enveloping method to protect a thermoset resin mass while it is being cured.

Another object of my invention is to provide a continuous method of effectively curing thermosetting resins in a desired shape; yet another object of my invention is to provide suitable apparatus for conducting my method in an expeditious manner.

In the drawings,

FIG. 4 is a diagrammatic side view illustrating a continuous adaptation of my method and an apparatus for its practice;

FIG. 5 is an isometric view illustrating the feed end of the apparatus of FIG. 4;

FIG. 6 is a section taken along line 6—6 of FIG. 4;

FIG. 7 is a fragmentary isometric view showing a type of thermoset impregnated mass cured by a preferred embodiment of my invention.

Corresponding reference characters indicate corresponding parts throughout the several views of the drawing.

The method herein described may be practiced as a batch operation, or as a continuous process if certain important steps are added. The batch operation will first be described.

Figure 1:
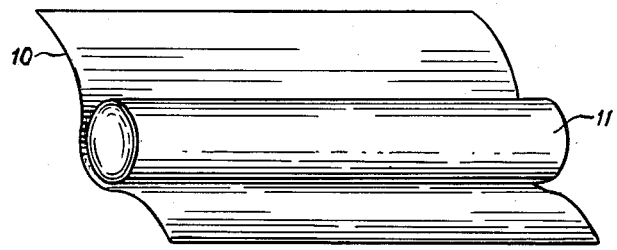
FIG. 1 is an isometric view showing a raw preformed mass containing uncured thermoset plastic that has been placed on a sheet of shielding film.
Figure 2:
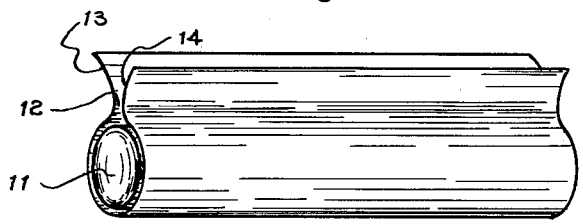
FIG. 2 shows the shielding film and mass of FIG. 1 after the mass has been enveloped by the film.
Figure 3:
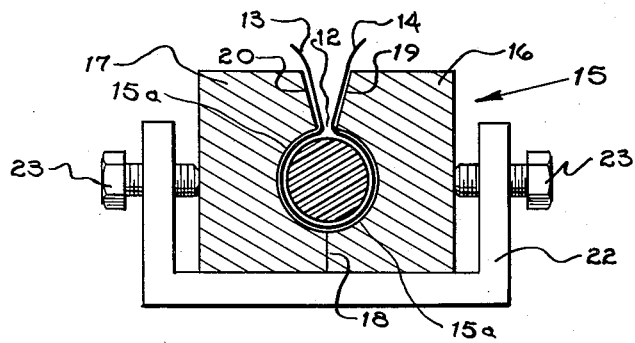
FIG. 3 is a cross section taken at right angles to the longitudinal axis of a suitable die that contains an enveloped mass to be cured.

In summary, my curing method when conducted as a batch operation, as partially diagrammatically illustrated in FIGS. 1, 2 and 3, comprises wrapping a sheet of a releasable shielding film around a sticky raw mass of thermosetting plastic to be cured, placing the wrapped raw mass in a die having the shape desired for the cured product, applying heat to the thermosetting mass while it is in the die, removing the cured wrapped mass from the die, and finally removing the film from the cured mass.

Referring in detail to FIGS. 1, 2 and 3, the shielding film 10 is wrapped about the thermosetting mass 11 to encompass the entire length of the raw mass.

Although my curing method will work if the film 10 is allowed to encircle the entire periphery of the mass with the free opposite extending sides 13 and 14 of the film pressed tightly together or overlaped to form a seal, I find that such a precedure results in making an inferior product in many instances since entrapped air and other gases expand when heat is applied in curing and often form bubbles and other defects in the end product. I therefore prefer to leave unwrapped a small portion of the surface of the raw mass and to not seal, overlap, or contact the opposite sides 13 and 14 of the protective shield 10. Thus the raw mass is effectively placed in an envelope of film, but, somewhat like in the case of an unsealed letter, the flap is left open to allow communication with the exterior.

It will be noted that the opposite sides 13 and 14 of protective film 10 form a pair of upwardly extending opposite open flaps which at the closest dimension between their opposite surfaces define the narrow throat 12, which extends axially the length of the raw mass. It is apparent from FIG. 2 and FIG. 3 that the shielding film 10 does not contact the small segment of the circumference of the raw mass that immediately underlies the throat 12 and extends lengthwise thereof. The unobstructed throat 12 thus allows a passage for the expulsion of heated gases from the mass being cured within the envelope 10.

FIG. 3 illustrates a simple die supporting and giving final form to the enveloped raw mass. The die is shown generally in cross section at 15. It has internal die forming surfaces 15a, which are configured to form a right circular cylinder in the embodiment of FIG. 3. The die is made of a rigid material and has two opposite halves 16 and 17 which meet flush along the vertical engaging surfaces 18. The upper opposite vertically inclined surfaces 19 and 20 of the die halves 16 and 17, respectively, do not engage but are a sufficient distance apart to allow the flaps 13 and 14 of the enveloped mass 11 to extend up through the top of die 15 without closing the unobstructed throat 12.

As is apparent from FIG. 3, the die halves 16 and 17 are held together by suitable means such as U-shaped clamp 22 with its oppositely facing screws 23. When the enveloped raw mass 11 is placed between the die halves with the flaps 13 and 14 extending upwardly through the opening defined between opposite upper vertically inclined surfaces 19 and 20, a suitable number of clamps 22 are positioned in spaced relation throughout the length of die 15 and the screws 23 are tightened to bring the die halves in tight engagement along the lower vertical engaging surfaces 18.

After the enveloped mass 11 is properly engaged in die 15, which exerts a pressure on it and gives it the desired shape, heat is applied to cure the thermoset material in that mass. Heat may be applied in various ways, as by gas burners, or electrical resistance heating elements disposed adjacent the die 15. Another method for applying heat, one that can be closely controlled, is to run hot liquid through hollow core spaces within the die. This liquid heating method is later herein described in more detail.

After the desired degree of curing of mass 11 has been accomplished, the die halves are separated and the enveloped mass 11 is removed. Then, the shielding film 10 is stripped off of the cured mass 11.

Although the previously described method is effective to make short lengths of products, it is not entirely suitable for continuously curing the feed of a preformed raw mass emerging from a flow-type preforming process. Moreover, I have found that a continuous method of curing wherein a moving, enveloped thermosetting mass is passed through a fixed die has certain advantages, one being the more thorough and efficient purging of air and other gases from the envelope and its contents. This results in a superior product.

In essence, my continuous method consists in placing the enveloped end of an elongated preformed mass into a die, as previously discussed in connection with FIGS. 1, 2 and 3. The die is heated and the enveloped thermosetting mass is fed through by pulling at an even rate that will allow the desired degree of curing to be effected in the mass passing through the die. The shielding envelope is then removed from the cured product.

FIGS. 4, 5, and 6 illustrate an apparatus suitable for practicing my method of curing in a continuous manner. This apparatus includes protective film roller 40, idler 43, riser 44, film guide means 45 and 46, die 51, ridge remover 53, and frictional driving wheels 55.

The mass to be cured 57 is fed continuously into die 51 by the frictional driving wheels 55, which tightly engage the surface of the solidified cured mass and rotate to pull the mass into die 51.

The continuously preformed mass 57 which is presently cured in the preferred embodiment of my invention is described in detail in my copending application Ser. No. 748,466, filed July 14, 1958, owned by my present assignee. In summary, it comprises alternately laid courses of glass rovings, thoroughly impregnated in epoxy resin, formed about a permanent unicellar mandrel of circular cross section. As shown in FIG. 7, 61 is the unicellar core, e.g. polystyrene or polyurethane. Longitudinal course of glass rovings 62 extends axially the length of the core and consists of a plurality of circumferentially spaced glass rovings lying about the outer surface thereof. Glass rovings course 63 is helically wrapped about course 62. About course 63, a second course of longitudinal glass rovings 64 is disposed. And about course 64 lies a second course 65 of helically wrapped glass rovings. The rovings are thoroughly impregnated in epoxy resin by immersing in liquid epoxy as the wrapping process is conducted. The details of this process can best be understood by referring to the aforesaid pending application.

Prior to the entry of mass 57 into the die 51, it is generally shaped in the configuration of the desired end product since mandrel 61 and roving courses 62, 63, 64 and 65 provide rigidity and form; however, the epoxy resin is in a thick liquid state and must be cured to form the tough solidified matrix of epoxy plastic desired in the end product.

In the continuous curing operation of raw mass 57 that is illustrated in FIGS. 4, 5 and 6, 57 is pulled by suitably powered driving wheels 55 over protective film 71, which is in turn being unrolled from storage roller 40 and fed into die 51 after passing over the riser means 44 and the envelope forming guide means 45 and 46. The riser means 44 may be any smooth surface that is mounted above the elevation of the idler and aligned to feed film to the envelope forming guide means 45 and 46. The guide means 45 and 46 may be simply a pair of disc inclined somewhat with the vertical and positioned in oppositely opposed fashion on either side of the film 71. The feed of 71 is accomplished by frictional engagement of 71 to mass 57.

It will be noted from FIG. 6 that the die 51 is shaped in cross section similar to the die illustrated in FIG. 3 and previously discussed. It has internal die forming surfaces 51a, which are configured to mold a right circular cylinder. For best results the diameter of the cylinder defined by these surfaces is slightly smaller than the diameter of the preformed raw mass 57. This insures that proper die pressure is exerted on the mass being cured and, in addition, facilitates the expulsion of gases through the open envelope surrounding the mass being cured. Die 51 is composed of die halves 16' and 17', which are held in engagement along lower vertical engaging surfaces 18'. Upper die surfaces 19' and 20' are oppositely vertically inclined and do not meet, providing sufficient clearance to allow the protrusion and separation of upwardly extended envelope flaps 73 and 74. Die halves 16' and 17' have hollow interiors 75 and 77. Tubular inlet fittings 79 and 80, and tubular outlet fittings 81 and 82, each of which is in communication with the hollow interior of its respective die half, provide a means to allow the circulation of hot water or other heating liquid through each of the die halves. Inlet conduits 83 and 84 and outlet conduits 85 and 86 are connected to a hot water heating and circulating system where the temperature and flow rate is maintained to the desired level.

The liquid temperature will vary for different thermosets, but in curing mass 57, I maintain the average temperature of the hot water in the die to about 200° F. Insulation 87 may be provided for die 51, if desired. The die and its associated components may be mounted on a suitable base 88. Suitable die holding means, such as clamp 22 shown in FIG. 3, are utilized to hold the die halves in place.

The mass 57, enveloped by 71, enters the die 51 at front surface 89, which is inclined with the vertical to assist in receiving envelope flaps 73 and 74 between oppositely inclined surfaces 19' and 20'. As is apparent from FIG. 6, flap 73 is supported by inclined face 19' and flap 74 by inclined face 20'.

As the enveloped mass 57 moves through die 51, heat is transferred from the circulating hot water, through the die, and to the mass 57. In some instances heat may also be generated by the exothermic reaction of the curing mass during its curing or polymerization. The degree of cure desired may be controlled by varing the length of die 51. Mass 57 may be completely cured while passing through die 51, or it may be cured to a degree where the epoxy resin will not flow and then introduced into an oven, not shown, to complete the curing operation.

Mass 57 passes out of die 51 and the enveloping film 71 is stripped off, either by hand or a suitable stripping device.

It can be seen that the above process leaves a thin strip along the upper surface of mass 57 which is not covered by film 71 during the curing operation. This results in a formation of a relatively rough upper ridge 91. If desired, ridge 91 may be removed by conventional abrasive wheel 75, or other suitable means.

For best results in the above process, the surfaces of die 57 that are in contact with moving envelope 71 should have a low coefficient of friction with the film. I prefer to use a suitable liner 93 to provide such surfaces. Liner 93, as shown in FIG. 4, is a flexible sheet of tetrafluoroethylene coated glass cloth that is tautly and stationarily positioned at front and rear liner supports 95 and 97. It will be noted that tetrafluoroethylene liner 93 bends reversely about curved support 99, passes over riser 44 and envelope shaping guides 45 and 46, and thence traverses the inner portion of die 51 throughout its length. Thus shielding film 71 over rides the stationary liner 93 throughout the passage of mass 57 through die 51. I prefer that liner 93 be of sufficient width that its opposite sides will form flaps to ride against inclined surfaces 19' and 20'.

In the above process I have used polypropylene, vinylidene chloride, and tetrafluoroethylene as the materials of construction for shielding film 71. All are quite satisfactory. The important thing is that the material selected for film 71 be smooth, strong, and flexible at the curing temperature being utilized, and that it be easily releasable from the thermosetting mass without the substantial adherence of any of the resin to it.

Although I have mentioned the importance of a smooth enveloping film in the practice of my invention, it should be pointed out that this would not preclude a pattern of any desired configuration from being on the inner surface of the film used in enveloping according to my method. The results would be a cured mass with the pattern of the film molded on its surfaces.

As various changes could be made in the above constructions and methods without departing from the scope of my invention, it is intended that all matter contained in the above description or shown in the accompanying drawings shall be interpreted as illustrative and not in a limiting sense.

I claim:
1. The method of curing an elongated raw mass of thick liquid thermosetting resin which has been generally preformed into a rod-like shape comprising:
   (1) Enveloping said rod-like raw mass with a strong, flexible and releasable shielding film but leaving said envelope open with the opposite edges of said film extending upwardly and spaced apart to provide a throat for the expulsion of gases from the interior of said envelope;
   (2) Continuously feeding said enveloped raw mass through a heated forming die; having a slot running substantially the length thereof to provide communication between the interior forming surfaces of the die and the exterior of said die, said edges of said film extending into said slot, said slot being of sufficient width to receive the upwardly extending edges of said film and yet provide for a narrow spacing therebetween to permit clearance for said throat;
   (3) Maintaining said throat between said edges during a substantial part of the passage of said mass through the forming die;
   (4) Removing said flexible film from the cured mass after it emerges from the forming die.

2. Apparatus for the continuous curing of a raw preformed mass containing thermosetting resin comprising rigid die means having interior forming surfaces, die heating means, protective film having two marginal edges, means to feed said protective film to shield said raw mass, and means to feed said raw mass through said die, said rigid die being shaped to form a recess running substantially the length of said die in communication with said interior forming surfaces, said recess being of sufficient width to receive both marginal edges of said film yet provide a narrow open throat therebetween when said edges extend through said recess.

3. The method of curing a raw mass of reinforced thick thermosetting resin, which mass has been generally preformed into an elongated rod-like shape comprising:
   (1) Enveloping said raw mass with a stronge, flexible, releasable shielding film to contact all except a small portion of the periphery of said raw mass with the central interior surface of said film and to permit the sides of said film to extend outwardly from said mass to form open flaps for said envelope and thereby define a narrow throat for communication with the interior of the envelope,
   (2) Simultaneously forming and expelling gas from said mass comprising the step of passing the enveloped raw mass through an elongated rigid die with smooth rod forming die surfaces therein of smaller diameter than the diameter of the preformed rod-like mass but with an open channel running substantially the length of said die to receive the open flaps of the envelope and allow communication of the mass with the exterior of the die during the motion of the enveloped mass through the die, said channel being of sufficient width to receive said flaps and allow spacing therebetween to maintain said narrow throat as said mass passes through the die,
   (3) Simultaneously with the passage of the mass through the die, the application of heat to said mass to cure it to the desired degree, and
   (4) Removing the enveloping film from the cured mass after it has been passed through the die.

4. Apparatus for the continuous curing of a raw preformed mass of reinforced thermosetting resin comprising an elongated heated die with smooth rod forming surfaces therein, said surfaces being spaced to define a diameter smaller than the diameter of said raw preformed mass, means permitting gas expulsion comprising a slot in communication with the exterior of said die and running substantially the length of said die, partial enveloping means sliding within the smooth forming surfaces of said die and sheathing the preformed mass around all but a small portion of its periphery, said partial enveloping means comprising a product contacting central portion and opposite marginal flaps extending into said slot, said slot being of sufficient width to receive said flaps yet provide for spacing therebetween to define an open throat that permits communication between the mass and the exterior of said die, feed means engageable with finished product emerging from said die to pull said mass through said die, and envelope shaping and feeding means.

5. Apparatus for continuously curing an elongated raw mass of thick liquid thermosetting plastic comprising movable shielding film having a product contacting central portion and a pair of opposite marginal edges, a product forming die having inner forming surfaces and an elongated slot running substantially the length of said die and communicating the exterior thereof, said slot being of a width to receive said pair of opposite marginal edges of said film when thrust therethrough yet provide a small opening therebetween, said opposite marginal edges extending through said slot substantially the length thereof to permit air to be expelled therebetween, and moving means to move said shielding film through said die.

6. The apparatus of claim 5 wherein said slot is defined by elongated, tapered sides.

References Cited in the file of this patent
UNITED STATES PATENTS

| | | |
|---|---|---|
| 906,215 | Gammeter | Dec. 8, 1908 |
| 1,622,340 | Paeplow | Mar. 29, 1927 |
| 2,141,405 | Randall | Dec. 27, 1938 |
| 2,210,000 | Peel | Aug. 6, 1940 |
| 2,528,168 | Paulsen | Oct. 31, 1950 |

FOREIGN PATENTS

| | | |
|---|---|---|
| 802,713 | Great Britain | Oct. 8, 1958 |